(12) United States Patent
Kiezebrink

(10) Patent No.: US 12,245,599 B2
(45) Date of Patent: Mar. 11, 2025

(54) METHOD OF PREPARING AN ANIMAL FOR SLAUGHTER

(71) Applicant: BALLOONX SÁ.R.L, Luxembourg (LU)

(72) Inventor: Harm Kiezebrink, Torekov (SE)

(73) Assignee: BALLOONX SA.R.L, Luxembourg (LU)

( * ) Notice: Subject to any disclaimer, the term of this patent is extended or adjusted under 35 U.S.C. 154(b) by 65 days.

(21) Appl. No.: 18/245,237

(22) PCT Filed: Sep. 16, 2021

(86) PCT No.: PCT/SE2021/050889
§ 371 (c)(1),
(2) Date: Mar. 14, 2023

(87) PCT Pub. No.: WO2022/060281
PCT Pub. Date: Mar. 24, 2022

(65) Prior Publication Data
US 2023/0354830 A1 Nov. 9, 2023

(30) Foreign Application Priority Data
Sep. 17, 2020 (NL) ................................. 2026492

(51) Int. Cl.
*A22B 3/00* (2006.01)
(52) U.S. Cl.
CPC ................................. *A22B 3/005* (2013.01)
(58) Field of Classification Search
CPC .................................. A22B 3/005; A61D 7/04
USPC ......................................................... 452/66
See application file for complete search history.

(56) References Cited

U.S. PATENT DOCUMENTS

| | | | | |
|---|---|---|---|---|
| 4,941,431 A * | 7/1990 | Anderson | ............... | A01K 1/031 |
| | | | | 119/420 |
| 5,435,776 A | 7/1995 | Owen et al. | | |
| 5,643,072 A | 7/1997 | Lankhaar et al. | | |
| 7,435,166 B2 * | 10/2008 | Benson | ................... | A22B 3/086 |
| | | | | 452/173 |
| 2006/0011143 A1 | 1/2006 | Drummond et al. | | |
| 2007/0249273 A1 * | 10/2007 | Francis | ................... | A22B 3/086 |
| | | | | 452/66 |
| 2007/0292559 A1 * | 12/2007 | Garwood | ............. | B65D 81/267 |
| | | | | 452/155 |
| 2009/0203302 A1 * | 8/2009 | Kiezebrink | ............ | A22B 3/005 |
| | | | | 452/66 |
| 2015/0050872 A1 | 2/2015 | Darling et al. | | |
| 2016/0044929 A1 * | 2/2016 | McMahon | ............. | A22B 3/005 |
| | | | | 452/66 |
| 2018/0132495 A1 | 5/2018 | Larsen et al. | | |
| 2020/0268000 A1 * | 8/2020 | Kiezebrink | ............ | A22B 3/005 |
| 2023/0354830 A1 * | 11/2023 | Kiezebrink | ............ | A22B 3/005 |

FOREIGN PATENT DOCUMENTS

| | | |
|---|---|---|
| EP | 1921921 B1 | 12/2009 |
| FR | 2863453 A1 | 6/2005 |
| NL | 9202289 A | 7/1994 |
| WO | 94/15469 A1 | 7/1994 |
| WO | 2005/058049 A1 | 6/2005 |
| WO | 2018/106115 A1 | 6/2018 |
| WO | 2022/112411 A1 | 6/2022 |

OTHER PUBLICATIONS

Search report from Priority Application No. NL 2026492 dated Jun. 23, 2021.
Search Report from corresponding European Application Application No. 21869860.3 dated Jan. 24, 2024.
Search Report from corresponding Netherlands Application No. 2026492 dated Jun. 23, 2021.
Office Action dated Aug. 1, 2024 from corresponding Canadian Application No. 3,195,391.

* cited by examiner

*Primary Examiner* — Richard T Price, Jr.
(74) *Attorney, Agent, or Firm* — Porter Wright Morris & Arthur LLP

(57) ABSTRACT

A method of preparing an animal for slaughter, said method comprising at least one the steps of subjecting the animal to a gaseous muscle relaxant without inducing unconsciousness of the animal; and stunning the animal in a space using a gas composition suitable for stunning.

16 Claims, No Drawings

METHOD OF PREPARING AN ANIMAL FOR SLAUGHTER

The present invention relates to a method of preparing an animal for slaughter. The method comprises at least one of the steps of subjecting the animal to a gaseous muscle relaxant without inducing unconsciousness of the animal; and stunning the animal in a space using a gas composition suitable for stunning. Stunning is a process of rendering an animal unconscious. While an animal loses consciousness, it suffers from convulsions. Such convulsions may reduce the value of the meat of the animal or even render it worthless.

The problem is in particular dire with poultry. Developments in raising poultry has resulted in poultry being heavier for a given young age than in the past. The weight causes bones to break more easily or become dislocated, reducing the value of the meat or to turn it into a loss. These days, young animals are reared to their slaughter weight in much shorter times than in the past. The strength of their bones does not keep up with their increase in weight. This problem of breaking bones or dislocating bones increases if young animals are reared for a somewhat longer period, as this results in a higher meat per day of rearing ratio.

The object of the present invention is to prepare an animal for slaughter with a reduced chance of damage to the meat.

In one embodiment, the method according to the invention is characterized in that the animal is subjected to a gaseous muscle relaxant before being unconscious.

The muscle relaxant will reduce the strength and/or number of convulsions, reducing the risk of bones breaking or becoming dislocated. Especially in older hormonal males production of stress hormones and changes in blood sugar may reduce the quality of the meat due to convulsions induced by stress. The muscle relaxant may reduce this effect.

The muscle relaxant will be present in a concentration that is insufficient for breathing to stop.

The animal is for example stunned using a gas containing $CO_2$.

Slaughter of the animal will be done using regular means, e.g. severing the head of the animal (poultry), or using a gun (mammals).

The space is for example a container or a pen. The method allows for multiple animals to be stunned simultaneously, which helps to reduce stress, for example in pigs which show a strong stress reaction when separated from their mates.

According to a favourable embodiment, the step of rendering the animal unconscious by stunning is preceded by a step of subjecting the animal to a further gas composition comprising
the gaseous muscle relaxant, and
at least 5 vol. % oxygen.

Thus the muscle relaxant has time to act before being subjected to the gas composition used for stunning.

The oxygen concentration is preferably at least 10 vol. %, more preferably at least 15 vol. % so as to reduce discomfort by the lack of oxygen.

According to a favourable embodiment, the gaseous muscle relaxant is introduced as a first foam.

This helps to ensure that the animal effectively is contacted with the muscle relaxant and saves on the amount of muscle relaxant used.

The foam expels ambient air around the animal and could even be used to expel substantially all air from the space.

According to a favourable embodiment, the animal is in a container and the ambient air is expelled from the container using the first foam.

Thus the animal is effectively contacted with the gas comprising the muscle relaxant without mixing of air and the said gas. This also saves muscle relaxant.

According to a favourable embodiment, the gas composition suitable for stunning is introduced as a second foam.

This helps to ensure that the animal effectively is contacted with the gas composition suitable for stunning and saves on the amount of gas composition used.

Such a method is known in the art, for example from WO2018/106115. This publication discloses a container with a lid having a hole allowing the passage of animals such as poultry. The container is provided with foam and chickens are introduced into the container and into the foam. The gas from the foam stuns the animal.

The second foam may also contain gaseous muscle relaxant so as to continue the exposure of the animal to the muscle relaxant.

According to a favourable embodiment, the first foam is broken down before the second foam is introduced.

This allows the animal to be observed, e.g. whether it is calm, and is lying down or is seated.

The first foam may be broken down using an anti-foam agent sprayed on the foam, or for example a jet of further gas to blow away the foam.

According to a favourable embodiment, the $CO_2$ concentration in the first foam is less than 10 vol. %, preferably less than 5 vol. % and more preferably less than 2 vol. %.

In this way, $CO_2$ the risk of the further gas composition causing convulsions is reduced, while an aversive reaction to $CO_2$ and therefore stress may be avoided.

According to a favourable embodiment, the oxygen concentration in the second foam is less than 2 vol. %, preferably less than 1 vol. % and more preferably less than 0.5 vol. %.

This will help to render the animal unconscious by anoxia. This phase lasts briefly because it typically it is not desired to kill the animal; just to stun it.

According to a favourable embodiment, the gaseous muscle relaxant is eliminated by displacing said muscle relaxant by the gas composition suitable for stunning.

Thus the animal can be subjected to the gas composition for stunning with little or no mixing of the gaseous muscle relaxant. This makes the method quicker and the start of the stunning gas more well defined.

The gaseous muscle relaxant is preferably captured and destroyed or reused (e.g. after purification and supplementing).

According to a favourable embodiment, the gaseous muscle relaxant is nitrous oxide.

Nitrous oxide ($N_2O$) is readily available and effective in concentrations of typically at least 15 vol. % but preferably at least 20 vol. %, more preferably at least 25 vol. %.

According to a favourable embodiment, the animal is stunned using a gas containing at least one compound chosen from $N_2$, Ar, CO, NO, and $CO_2$.

$N_2$ and Ar are odorless and tasteless gasses, which, in contrast to $CO_2$, birds do not show aversion to during initial exposure and resulting hypoxia is not or only mildly aversive. CO is odorless and induces loss of consciousness without pain or discernible discomfort, due to gradual induction of hypoxic conditions. NO reduces heart contractility and heart rate and acts as a vasodilator.

In other embodiments of the inventive method the steps of subjecting the animal to a gaseous muscle relaxant without inducing unconsciousness of the animal with means as described above can be performed independently of any stunning step. For example, in situations to facilitate transportation of animals it is advantageous to reduce the risk of damage to the meat or fracturing the bone structure of the body. The animal is subjected to a gaseous muscle relaxant, such as nitrous oxide, and at least 5 vol. % oxygen before being unconscious. In embodiments the gaseous muscle relaxant is administered with an expanding foam (as previously disclosed) to a closed container that is subsequently broken down before the animals are transported or subjected to other manipulations.

The invention will now be illustrated with reference to the example section below.

The following set up is proposed for testing the effectiveness of embodiments of the present method.

To assess the aversion of the gasses, 24 2.0-3.5 kg cross-bred commercial broiler chickens are used per treatment (CO or NO). To avoid isolation stress, the chickens are placed in pairs in a poultry transportation crate 1163×1163×255 mm. The crate is placed in a container that can be sealed off from the atmospheric air. In the top of the container a valve that allows air to expel from the container until it is completely filled with high expansion gas-filled anoxia foam. Prior to introducing the foam, the behaviour of the chickens is monitored by two cameras installed in the crate for 5 minutes under atmospheric conditions. Then, the CO or NO gas is administered, using the high expansion foam, using a high expansion anoxia foam nozzle placed at the bottom of the crate. The foam nozzle is connected to CO or NO cylinders and a fluid container with a mix of 97% water and 3% high expansion foam detergent. The gas and fluid mix creating the high expansion Anoxia gas filled foam is administered by gas and fluid regulators and flow meters. Once the container is filled with foam, the atmospheric air is expelled from the container through the valve at the top of the container. The container is completely sealed off after the valve is closed. The foam inside the container is than destructed by a powerful pulse of the gas or gas mixture, similar to the content inside the foam. As a result, the movements of the birds can be registered via the cameras inside the crate. The chickens remain inside the sealed off container until they are dead. During the total exposure time, video recordings are collected for analysis of the behaviour, including indicators of aversion, unconsciousness and death. After completion of the procedure, the container is opened.

To assess the time to lose consciousness and the onset of death, 24 2.0-3.5 kg cross-bred commercial broiler chickens are used per treatment (CO or NO). To avoid isolation stress, the chickens are placed in pairs in in a poultry transportation crate 1163×1163×255 mm. Before placing the chickens in the crate, three needle electrodes are implanted in the head of one chicken of each pair of chickens for the recording of an electroencephalogram (EEG). The electrodes are connected to an Index of Consciousness (IoC) view monitor to record the EEG signal. Basal data is recorded for 5 minutes in atmospheric conditions. The crate is placed in a container that can be sealed off from the atmospheric air. In the top of the container a valve that allows air to expel from the container until it is completely filled with high expansion gas-filled anoxia foam. Prior to introducing the foam, the behaviour of the chickens is monitored by two cameras installed in the crate for 5 minutes under atmospheric conditions. Then, the CO or NO gas is administered, using the high expansion foam, using a high expansion anoxia foam nozzle placed at the bottom of the crate. The foam nozzle is connected to CO or NO cylinders and a fluid container with a mix of 97% water and 3% high expansion foam detergent. The gas and fluid mix creating the high expansion Anoxia gas filled foam is administered by gas and fluid regulators and flow meters. Once the container is filled with foam, the atmospheric air is expelled from the container through the valve at the top of the container. The container is completely sealed off after the valve is closed. The foam inside the container is than destructed by a powerful pulse of the gas or gas mixture, similar to the content inside the foam. During the total exposure time, the EEG signal is recorded, and video recordings are collected for analysis of the behaviour of the chickens during gas exposure. After completion of the procedure, the container is opened.

The above control experiments are repeated, but now preceded by introducing nitrous oxide as a muscle relaxant at various concentrations. Before and after the experiments, meat quality is assessed by assessing chickens for the presence of skin lesions, open wounds, bruising on wings and breasts, dislocation of joints and fracture of leg and wing bones.

The described experiments are equally applicable for other larger animals than poultry by suitable measures in dimensioning.

The invention claimed is:

1. A method of preparing an animal for slaughter, said method comprising the step of stunning the animal in a space using a gas composition suitable for stunning, wherein the method further comprises a preceding step wherein the animal is subjected to a gaseous muscle relaxant composition before being stunned.

2. The method according to claim 1, wherein the gaseous muscle relaxant composition comprises
   a gaseous muscle relaxant, and
   at least 5 vol. % oxygen.

3. The method according to claim 1, wherein the gaseous muscle relaxant composition is introduced as a foam.

4. The method according to claim 3, wherein the animal is in a container and the ambient air is expelled from the container using a first foam, comprising the gaseous muscle relaxant composition.

5. The method according to claim 3, wherein the $CO_2$ concentration in the foam comprising the gaseous muscle relaxant composition is less than 10 vol. %.

6. The method according to claim 3, wherein the $CO_2$ concentration in the foam comprising the gaseous muscle relaxant compositions is less than 5 vol. %.

7. The method according to claim 3, wherein the $CO_2$ concentration in the foam comprising the gaseous muscle relaxant composition is less than 2 vol. %.

8. The method according to claim 1, wherein said gas composition suitable for stunning is introduced as a foam.

9. The method according to claim 8, wherein said gaseous muscle relaxant composition is introduced as a first foam and said gas composition suitable for stunning is introduced as a second foam.

10. The method according to claim 9, wherein said first foam is broken down before said second foam is introduced.

11. The method according to claim 8, wherein the oxygen concentration in the foam comprising the gas composition suitable for stunning is less than 2 vol. %.

12. The method according to claim 8, wherein the oxygen concentration in the foam comprising the gas composition suitable for stunning is less than 1 vol. %.

13. The method according to claim 8, wherein the oxygen concentration in the foam comprising the gas composition suitable for stunning is less than 0.5 vol. %.

14. The method according to claim 1, wherein the gaseous muscle relaxant composition is eliminated by displacing said muscle relaxant by the gas composition suitable for stunning.

15. The method according to claim 1, wherein the gaseous muscle relaxant is nitrous oxide.

16. The method according to any of the preceding claims, wherein the animal is stunned using a gas containing at least one compound selected from $N_2$, Ar, CO, NO, and $CO_2$.

* * * * *